US010065700B2

(12) United States Patent
Platz

(10) Patent No.: US 10,065,700 B2
(45) Date of Patent: Sep. 4, 2018

(54) ARRANGEMENT FOR THE VIBRATION DECOUPLING OF A MOTOR FOR MOTORIZED TWO-WHEELERS, HAVING AN ENGINE-MOUNT SWING ARM

(71) Applicant: Bayerische Motoren Werke Aktiengesellschaft, Munich (DE)

(72) Inventor: Christoph Platz, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/163,158

(22) Filed: May 24, 2016

(65) Prior Publication Data

US 2016/0264207 A1 Sep. 15, 2016

Related U.S. Application Data

(63) Continuation of application No. PCT/EP2014/074725, filed on Nov. 17, 2014.

(30) Foreign Application Priority Data

Jan. 17, 2014 (DE) ........................ 10 2014 200 765

(51) Int. Cl.
*B62K 11/04* (2006.01)
*B62K 25/28* (2006.01)
(Continued)

(52) U.S. Cl.
CPC .............. *B62K 11/04* (2013.01); *B62K 11/10* (2013.01); *B62K 25/283* (2013.01); *B62M 7/02* (2013.01);
(Continued)

(58) Field of Classification Search
CPC ...... B62K 11/04; B62K 11/10; B62K 25/283; B62K 2202/00; B62M 7/02; B60G 3/12; B60G 3/14; B60G 13/003
See application file for complete search history.

(56) References Cited

U.S. PATENT DOCUMENTS

2007/0074920 A1\* 4/2007 Hayashi ................. B62K 11/10
180/228
2008/0202840 A1\* 8/2008 Shimozato ............. B62K 11/10
180/291
(Continued)

FOREIGN PATENT DOCUMENTS

DE 197 51 371 A1 12/1998
DE 696 01 200 T2 5/1999
(Continued)

OTHER PUBLICATIONS

International Search Report (PCT/ISA/210) issued in PCT Application No. PCT/EP2014/074725 dated Jan. 28, 2015 with English-language translation (four (4) pages).
(Continued)

*Primary Examiner* — Joseph M Rocca
*Assistant Examiner* — Marlon A Arce
(74) *Attorney, Agent, or Firm* — Crowell & Moring LLP

(57) ABSTRACT

An arrangement for the vibration decoupling of a motor for motorized two-wheelers is provided. In an embodiment of the two-wheeler an engine-mount swing arm is mounted to be rotatable about a first shaft. The first shaft is mounted on the vehicle frame of the two-wheeler to be rotatable about a second shaft by way of a decoupling swing arm. A support rod fitted with damping buffers is provided on the engine-mount swing arm, oriented such that vibrations are decoupled in and against the direction of travel, with vibra-
(Continued)

tions being decoupled in the direction of the cylinder axis and providing good anti-squat behavior.

5 Claims, 2 Drawing Sheets

(51) Int. Cl.
  *B62K 11/10* (2006.01)
  *B62M 7/02* (2006.01)
  *B60G 13/00* (2006.01)
  *B60G 3/14* (2006.01)
  *B60G 3/12* (2006.01)
(52) U.S. Cl.
  CPC ............... *B60G 3/12* (2013.01); *B60G 3/14* (2013.01); *B60G 13/003* (2013.01); *B62K 2202/00* (2013.01)

(56) References Cited

U.S. PATENT DOCUMENTS

2013/0061950 A1* 3/2013 Inaoka .................... B62J 35/00
  137/351
2013/0175102 A1* 7/2013 Tsukamoto ............ B62K 11/10
  180/21

FOREIGN PATENT DOCUMENTS

| DE | 20 2007 014 473 | * | 1/2006 |
| DE | 20 2007 014 473 U1 | | 1/2008 |
| DE | 60 2004 013 390 T2 | | 6/2009 |
| EP | 0 755 852 A1 | | 1/1997 |
| EP | 1 457 413 A2 | | 9/2004 |
| EP | 1 964 768 A1 | | 9/2008 |
| EP | 2 275 333 A2 | | 1/2011 |
| FR | 2907417 | * | 10/2006 |
| FR | 2 907 417 A1 | | 4/2008 |
| JP | 5-178267 A | | 7/1993 |
| JP | 2005-255163 A | | 9/2005 |

OTHER PUBLICATIONS

German-language Written Opinion (PCT/ISA/237) issued in PCT Application No. PCT/EP2014/074725 dated Jan. 28, 2015 (four (4) pages).

German Search Report issued in counterpart German Application No. 10 2014 200 765.8 dated Jan. 14, 2015 with partial English-language translation (twelve (12) pages).

German-language Office Action issued in counterpart European Patent Application No. 14799753.0 dated Nov. 9, 2017 (Five (5) pages).

* cited by examiner

ARRANGEMENT FOR THE VIBRATION DECOUPLING OF A MOTOR FOR MOTORIZED TWO-WHEELERS, HAVING AN ENGINE-MOUNT SWING ARM

CROSS REFERENCE TO RELATED APPLICATION

This application is a continuation of PCT International Application No. PCT/EP2014/074725, filed Nov. 17, 2014, which claims priority under 35 U.S.C. § 119 from German Patent Application No. 10 2014 200 765.8, filed Jan. 17, 2014, the entire disclosures of which are herein expressly incorporated by reference.

BACKGROUND AND SUMMARY OF THE INVENTION

The invention relates to an arrangement for the vibration decoupling of a motor for motorized two-wheelers having an engine-mount swing arm, and specifically to an arrangement for the vibration decoupling of a motor for motorized two-wheelers, particularly for scooters having a scooter engine.

Engine-mount swing arms are known in the state of the art in many different designs. Engine-mount swings are used for the motor decoupling of engine suspensions. The Piaggio Beverly, for example, uses a double swing arm. On the other hand, there are also constructions where the engine suspension is decoupled by a single swing arm, as, for example, in the case of the Honda PCX or the Kymco Downtown 300i.

The necessity of such constructions known from the state of the art is a result of the fact that all known motor scooter constructions, particularly those with an engine-mount swing arm, have a conventional suspension of the rear wheel. The engine-mount swing arm is therefore typically supported at the rear frame by way of a spring strut. For eliminating the problems of the vibration decoupling between the frame and the engine-mount swing arm, for example, elastic bushings or damped intermediate levers are used. These approaches, however, are usually not subject to any constraint with respect to the elasticity or the conceivable moving direction.

Japanese Patent Document No. JP 2005255163A shows a construction for a scooter with a swinging arrangement of a drive unit. Here, the engine-mount swing arm is disposed at a connecting section and further has a push rod.

From French Patent No. Document FR 2907417A shows a further example of an engine-mount swing arm with a suspension device and has a clamp formed of a damping material and two swinging rods. The two swinging rods are arranged to be offset with respect to one another at an angle; and specifically are mutually offset at an angle between approximately 75° and approximately 105°, preferably of approximately 90°. A first reaction rod, which is situated between the first end of at least one of the swinging rods and the chassis, extends approximately vertically, and a second reaction rod, which is situated between the second swinging rod and the chassis, extends approximately horizontally. The first end of the first approximately vertical reaction rod is connected with the first end of the second swinging rod. The second end of the first swinging rod comprises lateral vehicle body parts and/or a transversal pipe for the mounting at the chassis of the vehicle. The swinging rods are additionally constructed as mechanically welded swinging rods.

A further decoupling of an engine mount is shown in European Patent Document No. EP 2275333A2. This implementation has the purpose of absorbing vibrations which take place not only in the up-and-down and in the back-and-forth direction but also in a direction of the vehicle width. The suspension device for the swing arm comprises a vehicle frame, the drive unit for transmitting a driving force to the rear wheels, a joint mechanism for moving the face of the drive unit at the vehicle body frame and a rear shock absorber unit for suspending the rear of the drive unit at the vehicle body frame. Furthermore, a connecting rod is arranged at the joint mechanism and is elastically supported, as well as an elastic element for the contact against the vehicle body frame in the transverse direction of the vehicle.

German Patent Document No. DE 19751371 shows an engine-mount swing arm for motor-driven vehicles, such as motor scooters and light vehicles for the transport of persons, which are equipped with a drive motor arranged in the area of an end of an elongated swing-arm housing, and a hub rotatably disposed in the area of the other end of the swing-arm housing for holding a vehicle driving wheel. The drive shaft of the drive motor guided into the swing-arm housing is coupled by a transmission device encapsulated in the swing-arm housing with the wheel hub for the vehicle drive wheel, and the swing-arm housing has elements for the swivelable bearing about an axis at or in the frame of the vehicle spaced away from the axis of rotation of the wheel hub and extending parallel to the latter.

Such engine-mount swing arms known from the state of the art have various disadvantages of a constructive nature, which influence the driving behavior of the two-wheeler and have, for example, no satisfactory pitch compensation. The position of the linkage of the engine-mount swing arm influences the starting pitch compensation as well as the braking pitch compensation. It is desirable for the vehicle not to compress or rebound when starting and braking. The starting pitch compensation is determined in the scooter-typical swing-arm arrangement by the position of the swing-arm rotational/swivel axis.

For reducing the pitch compensation, it is therefore necessary to use a location of the position of the swing-arm rotational/swivel axis that is as optimal as possible, in which case, other constructive and driving-dynamic factors in the construction of the engine-mount swing arm and its suspension should simultaneously be taken into account. These are dependent on several factors, such as the height of the center of gravity of the vehicle with a driver, because the pitch compensation is a vehicle reaction when the vehicle is used.

The location of the swing-arm pivot point above the cylinders, as implemented in the state of the art in the case of the Honda PCX125 and Kymco 300-400 vehicle models, is disadvantageous for the starting pitch compensation and, for example, the size of the helmet box. In the case of an arrangement above the cylinder, this results in noticeable disadvantages for the starting pitch compensation. In the state of the art, it is attempted to reduce such disadvantages of an unfavorable position of the swing-arm rotational/swivel axis by using correspondingly hard springs, which, in turn, results in discomfort.

It is therefore necessary to overcome the above-mentioned disadvantages and, in particular, provide vibration decoupling arrangements for an engine-mount swing arm which have little or no negative influence on the vehicle handling, reduce the pitch compensation and, in particular, can be produced in a cost-effective manner.

It is therefore an object of the invention to provide a solution for a vibration decoupling of an engine-mount swing arm of a motorized two-wheeler, particularly a motor scooter, which has a simple design, can be implemented with few components and, in the case of which, vibrations can be effectively decoupled from the frame or reduced.

It is a fundamental idea of the present invention to implement the vibration decoupling of a motor having an engine-mount swing arm, specifically a single swing arm, in that a supporting rod designed with buffers is provided at the engine-mount swing arm such that a vibration decoupling can be achieved in a main vibration direction of the motor and particularly in and against the vehicle longitudinal direction.

In a particularly advantageous embodiment of the invention, the single swing arm is therefore arranged in a lower area, specifically preferably in an area below the cylinder. In a further preferred embodiment, the invention relates to an arrangement wherein the two-wheeler is provided with a motor having a balance shaft for compensating the vibrations of the first order by free inertia forces. This has the result that the existing vibrations of the second order are low and are significant essentially in the piston motion direction of the cylinder (cylinder direction). In this respect, the arrangement according to the invention is to be designed such that the decoupling takes place in the direction of motion of the piston.

According to the invention, an arrangement for the vibration decoupling of a motor for motorized two-wheelers having an engine-mount swing arm is therefore designed, which is disposed to be rotatable about a first shaft, the first shaft with a decoupling swing arm being, rotatably on a second shaft, disposed on the vehicle frame of the two-wheeler, and further, a rod, such as a supporting rod being provided at the engine mount swing arm, whose orientation was selected such that a vibration decoupling is caused in and against the vehicle longitudinal direction or that a vibration decoupling is caused in the direction of the cylinder axis. The cylinder axis direction is advantageously selected such that the arrangement for the vibration decoupling according to the invention simultaneously causes a damping during motions in the longitudinal direction of the vehicle, for example, when driving over surface irregularities of the road.

In a further preferred embodiment of the invention, the arrangement for the vibration decoupling of the motor having a decoupling swing arm (intermediate swing arm) is constructed below the cylinder for linking the engine-mount swing arm. Advantageously, low expenditures and low space requirements are thereby achieved, and the pitch compensation is optimized by the arrangement below the cylinder. Such an embodiment not known from the state of the art causes a particularly comfortable and space-saving vibration decoupling.

It is further advantageous for the second shaft of the decoupling swing arm as the decoupling shaft on frame-side fastening clips to be rotatably disposed on the latter. In a further preferred embodiment of the invention, the first shaft is arranged as the engine-mount swing arm shaft below the second shaft.

In a further preferred embodiment of the invention, the arrangement for a motorized two-wheeler having a single-cylinder motor is designed with a compensation threshold, and the supporting rod is therefore oriented along the cylinder axis direction or essentially parallel to the latter. In this manner, the vibrations of the first order can be directly absorbed by the compensation threshold of the single-cylinder engine, while the vibrations of the second order take place in the cylinder direction. The orientation according to the invention of the decoupling swing arm or of the supporting rod with the decoupling swing arm ensures that an effective decoupling of the occurring vibrations takes place.

The arrangement of the decoupling swing arm is therefore preferably designed such that the connection line of both shafts is perpendicular to the cylinder axis or vertical thereto.

It is further advantageous for the decoupling swing arm to have two connecting arms with one fastening element respectively arranged at both ends, for the respective shafts, i.e. the first shaft and the second shaft.

It is further preferred for the supporting rod to be fastened at its fastening-side end together with a fastening element directly to the first shaft of the engine-mount swing arm. As a result, a space-saving construction can be achieved; the number of participating components can be reduced simultaneously, and, in addition, a damping of the supporting rod with its damping buffers can be achieved that is initiated directly at the axis of rotation.

It is a further advantage for the supporting rod to be equipped with two rubber buffers at its non-fastened, i.e. free end, one of the rubber buffers respectively being pressed against one frame-side stop respectively, depending on the motion of the engine-mount swing arm in or against the direction of motion. It is therefore additionally preferable for the supporting rod to be oriented in the vehicle longitudinal direction of the motorized two-wheeler and simultaneously in the direction of the main vibration axis of the motor or of the cylinder, so that the vibrations of the motor, which were not absorbed by the compensation shaft, and secondarily the vibration in the cylinder direction, are effectively damped by the arrangement according to the invention.

As a result of a deflection of the rear spring struts from the vertical line, a force can act upon the engine-mount swing arm in (or against) the vehicle direction. It is advantageous for these longitudinal forces, at least to a certain extent, to be canceled again from the decoupling switch arm by an opposite force, in the longitudinal direction of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
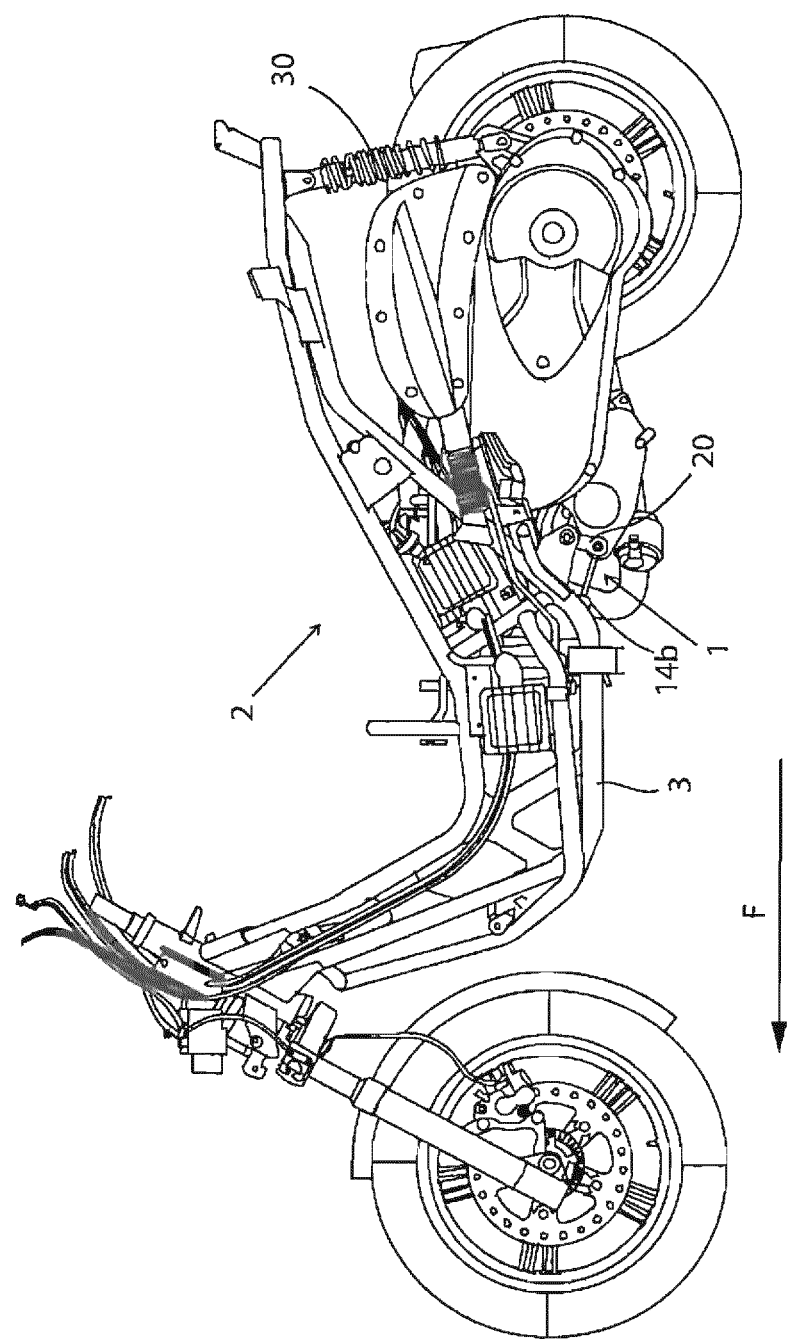
FIG. 1 is a schematic lateral view of a motorized two-wheeler with the arrangement for the vibration decoupling according to an embodiment of the present invention.
Figure 2:
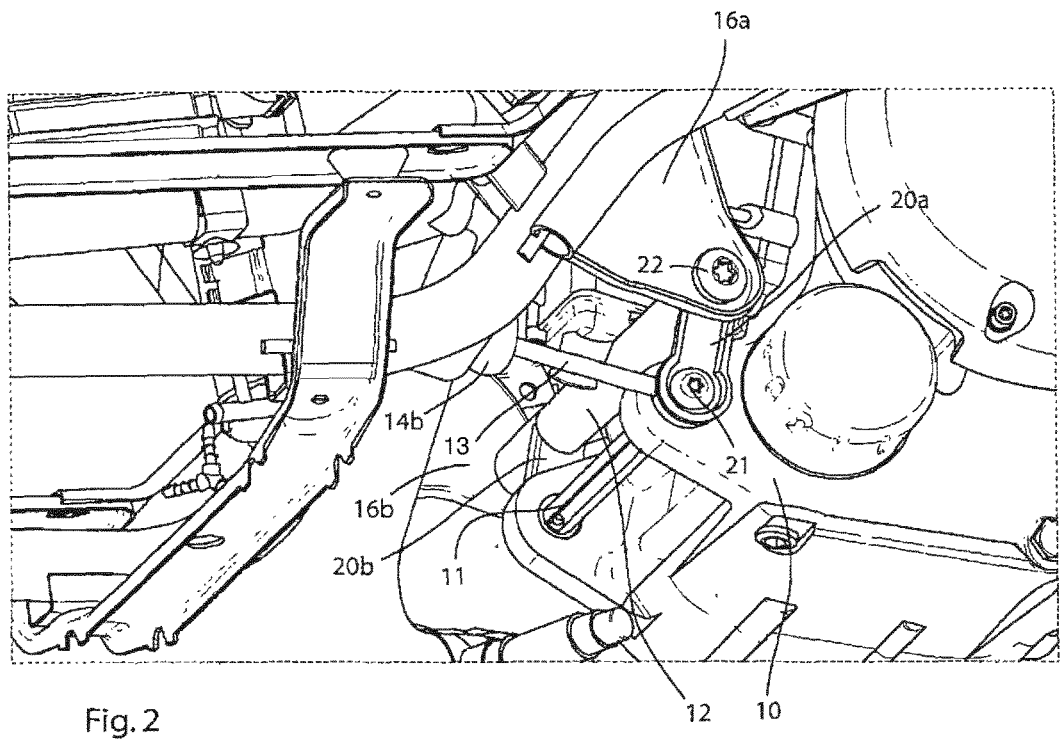
FIG. 2 is a detailed perspective view of the engine-mount swing arm from FIG. 1.
Figure 3:
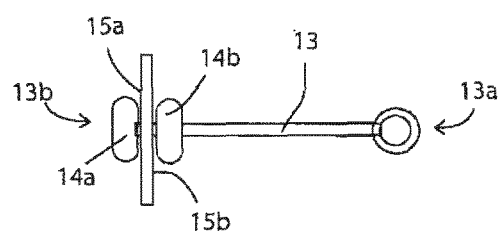
FIG. 3 is a schematic view of an embodiment of the supporting rod with damping buffers according to the present invention.

FIG. 1 illustrates an example of a view from a side of a motorized two-wheeler 2, which is designed with an example arrangement 1 for the vibration decoupling according to the invention. FIG. 2 illustrates the arrangement 1 in a detail view. In the following, reference will be made to an equal extent to FIGS. 1 to 3. The arrangement 1 for the vibration decoupling is designed with an engine-mount swing arm 10, which is disposed to be rotatable about a first shaft 11. In the following, the first shaft 11 will also be called the shaft of the engine-engine mount swing arm 10. The first shaft 11 with a decoupling swing arm is rotatably disposed at a second shaft 12 on the vehicle frame 3 of the two wheeler 2. Furthermore, a supporting rod 13 equipped with damping buffers 14a, 14b is provided at the engine-mount swing arm 10. In FIGS. 1 and 2 only the damping buffer 14b is visible of the damping buffers 14a, 14b, while the second damping buffer 14a is situated farther away at the extreme end of the supporting rod 13, as illustrated in FIG. 3. One frame-side stop 15a, 15b respectively is situated between the damping buffers 14a, 14b.

In the present embodiment of the invention, the supporting rod 13 is situated approximately in the vehicle longitudinal direction F or is arranged to be slightly rotated at an angle of approximately 15° with respect to the longitudinal direction F of the vehicle. The orientation of the decoupling swing arm 20 and of the supporting rod 13 amounts approximately to an angle of 90°. In other words, this means that the supporting rod is oriented approximately in the direction of motion of the cylinder, i.e. in the cylinder direction, while the decoupling swing arm 20 is arranged in a direction orthogonal thereto, thus approximately in a vertical direction (transverse direction with respect to the longitudinal direction of the vehicle). Likewise, the spring strut 30, which is illustrated in FIG. 1, is arranged in a vertical direction.

FIG. 2 further shows that the second shaft 12, which as the decoupling shaft, is disposed at frame-side fastening clips 16a, 16, is rotatably disposed on the latter. In this case, the fastening clips may project as sheet metal clips or bearing elements at the frame in such a manner that the second shaft 12 is in each case disposed between the fastening clips 16a, 16b. The decoupling swing arm 20 further has two connecting arms 20a, 20b with one fastening element 21, 22 respectively arranged at both ends for the respective shafts 11, 12. The supporting rod 13 is fastened with its fastening-side end 13a directly together with a fastening element 21 of the first shaft 11 of the engine-mount swing arm 10. In an alternative embodiment of the invention, two supporting rods 13 could preferably be arranged in parallel, in each case, together with a fastening element 21, on a left and right end of the first shaft together with the latter.

As explained above, at its movable end 13b, the supporting rod 13 has two damping buffers 14a, 14b, preferably designed as rubber buffers, the rubber buffers 14a, 14b, in each case being pressed against a frame-side stop 15a, 15b, depending on the direction of motion of the engine-mount swing arm in or against the direction of motion.

In the present embodiment of the invention, the frame-side stop is arranged such that the supporting rod projects through a frame opening, specifically through an opening in the frame-side stop, in order to be able to support itself by the first rubber buffer 14b against the stop in the direction of travel, while it can support itself against the direction of travel by the second buffer 14a on the opposite side of the frame-side stop. In order words, through an opening in the frame, the supporting rod can in each case appropriately dampen the vibrations by way of the buffers 14a, 14b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for decoupling engine vibration from a frame of a two-wheel motor vehicle, comprising:
   a first shaft;
   an engine-mount swing arm with an engine and one of the two vehicle wheels, the engine-mount swing arm being arranged to rotate about the first shaft;
   a second shaft disposed on fastening clips of a frame of the motor vehicle;
   a decoupling swing arm arranged to couple the first shaft and the second shaft;
   a supporting rod coupled by a fastening element at a first end to the first shaft; and
   at least one damping buffer arranged to support a second end of the supporting rod on the frame of the motor vehicle,
   wherein
   the first shaft is located vertically below the second shaft,
   the decoupling swing arm is rotatable about the second shaft and includes connecting arm portions at opposite ends of the decoupling swing arm, each of the connecting arm portions being coupled to a respective one of the first and second shafts,
   the supporting rod is oriented to decouple engine vibration from the frame in at least one of a longitudinal direction of the motor vehicle and an axis direction of a cylinder of the engine,
   the frame includes a frame side stop configured to receive the second end of the supporting rod in a manner that permits supporting rod movement along a longitudinal axis of the supporting rod, and
   the supporting rod is supported against the frame side stop by rubber buffers located on respective front and rear sides of the frame side stop in a manner that permits and dampens supporting rod movement in a direction of the supporting rod longitudinal axis.

2. The arrangement according to claim 1, wherein the engine is a vibration-compensated single-cylinder engine, and
the supporting rod is oriented along the cylinder axis direction.

3. The arrangement according to claim 1, wherein the decoupling swing arm is a single swing arm.

4. The arrangement according to claim 3, wherein the decoupling swing arm is located lower on the motor vehicle than the engine cylinder.

5. The arrangement according to claim 1, wherein the second shaft is rotatably disposed on the fastening clips of the frame.

* * * * *